United States Patent [19]
Juergens

[11] Patent Number: 4,458,535
[45] Date of Patent: Jul. 10, 1984

[54] DRIVE DEFECT DETECTOR

[76] Inventor: Jack W. Juergens, 6359 Cavalier Corridor, Falls Church, Va. 22044

[21] Appl. No.: 482,529

[22] Filed: Apr. 6, 1983

[51] Int. Cl.³ .................... G01M 17/04; G01P 15/135
[52] U.S. Cl. ......................................... 73/651; 73/514; 340/52 R
[58] Field of Search .................. 73/651, 654, 514; 200/61.51, 61.49; 340/52 R, 52 A, 65

[56] References Cited
U.S. PATENT DOCUMENTS

| | | | |
|---|---|---|---|
| 2,370,497 | 2/1945 | Shanklin | 200/61.51 |
| 3,498,115 | 3/1970 | Liskey | 73/654 |
| 4,279,159 | 7/1981 | Powell et al. | 73/651 |

Primary Examiner—James J. Gill

[57] ABSTRACT

This invention is an on-board electro-mechanical system designed to detect and indicate abnormal or defective conditions in any or all wheels of a car while it is in motion at highway speed.

Each wheel of the car has a vibration sensor to detect abnormal vibration and send a signal to a defect indicator panel. The defect indicator panel of four lights visible to the driver is that unit of the system which warns the driver that a potentially hazardous condition exists, thus minimizing the liklihood of an accident resulting from the condition if the warning is heeded.

1 Claim, 3 Drawing Figures

DRIVE DEFECT DETECTOR

REFERENCES CITED

U.S. Patent Documents:
U.S. Pat. No. 3,526,873, 9/70, Burt;
U.S. Pat. No. 4,279,159, 7/81, Powell and Powell.

BRIEF SUMMARY

The Drive Defect Detector is an on-board system designed to detect and indicate wheel or tire imbalance, tire defect, wheel defect, misalignment, or worn shock absorber while the car is in motion at highway speed. It consists of four vibration sensors, one for each wheel of the car, mounted on and parallel to the center axis of the individual wheel's suspension member and connected electrically to a four-light electrical defect indicator located on or near the car's instrument panel and visible to the driver at all times.

THE VIBRATION SENSOR

FIG. 1

Figure 1:
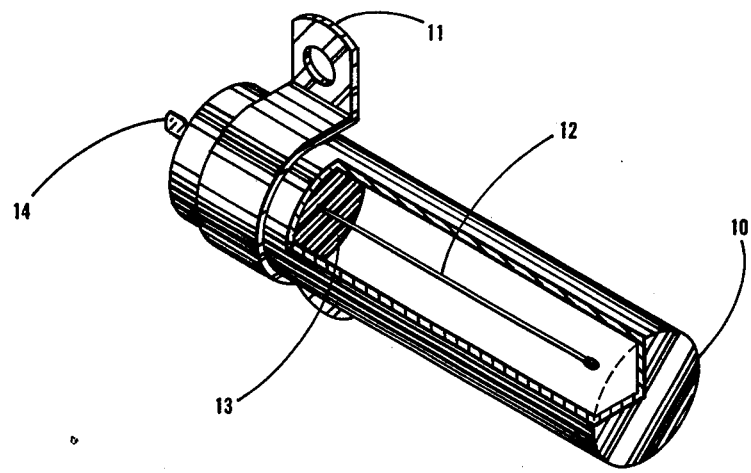
FIG. 1 is a three-view drawing, two views in perspective and partially in section, of a vibration sensor.
Figure 1:
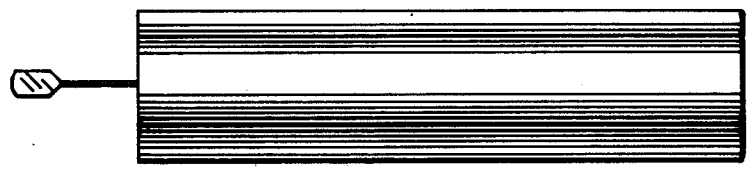
Figure 1:
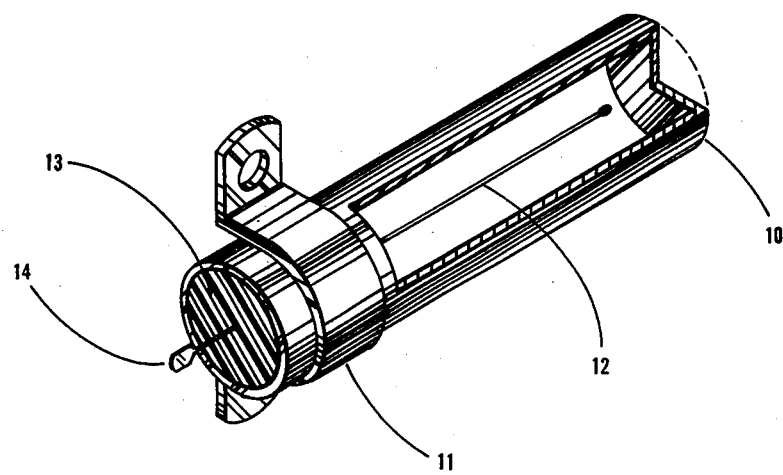

The vibration sensors, of which there are four (one for each wheel), consist individually of a water-tight metal tube or shell 10 and a sensor mounting bracket 11 which also serves as the ground connection for electrical purposes. Housed inside the water-tight metal shell is a flexible wire conductor or probe 12 completely insulated at its base from the metal shell by plastic insulating material 13. This flexible metal conductor constitutes the core of the vibration sensor and is wired electrically to the negative lead of the defect indicator light through a standard automotive electrical connector 14.

THE DEFECT INDICATOR

FIG. 2

The defect indicator is a rectangular plastic or metal box 15 containing four indicator lights of appropriate voltage, one for each vibration sensor, arranged in a configuration corresponding to the left front (LF) 16, right front (RF) 17, left rear (LR) 18, and right rear (RR) 19 wheels of the car. Each indicator light is connected to its corresponding sensor by an electrical conductor 20, 21, 22, and 23, constituting the negative lead. An electrical conductor being the positive lead 24 is wired to the accessory circuit so that the indicator panel is operative whenever the car ignition switch is ON. Optionally the indicator can be wired with an in-line manual switch allowing the operator to switch off the indicator when driving on rough roads.

A SCHEMATIC DIAGRAM

FIG. 3

The schematic diagram of the Drive Defect Detector system integrates the four vibration sensors 25, 26, 27, and 28 with the defect indicator 15. The vibration sensors are located physically on and attached firmly to the center axis of the suspension member of each of the four wheels of the car. The defect indicator is located on or near the car's instrument panel and is energized through the fused accessory circuit 29 and the ignition switch 30, drawing its power from the battery 31.

DETAILED DESCRIPTION

The Drive Defect Detector is an on-board electromechanical system designed to detect and indicate wheel or tire imbalance, tire defect, wheel defect, misalignment, or worn shock absorber while the car is in motion at highway speed. It consists of four vibration sensors, 25, 26, 27, and 28, one for each wheel of the car, mounted securely on and parallel to the center axis of the individual wheel's suspension member; and a four-light electrified defect indicator 15 located on or near the car's instrument panel and visible to the driver at all times.

Each sensor comprises a flexible piano wire or similar flexible metal conductor 12, weighted at its outboard tip, and mounted in insulation 13 at its inboard end with an insulated electrical terminal 14 or single lead plug to provide electrical continuity through a wire leading from that terminal to an indicator light on the car's instrument panel. Enclosing the flexible wire conductor is a water-tight metal tube or shell 10 fitted with a metal bracket 11 for mounting the sensor on the suspension member and grounding the tube or shell to the chasis. The vibration sensor assembly is approximately three inches in length and 0.75 inch in diameter.

The defect indicator consists of four miniature appropriate voltage light bulbs, 16, 17, 18, and 19, one for each wheel, arranged in configuration corresponding to the left front (LF), right front (RF), left rear (LR), and right rear (RR) wheels of the car. Each light has one terminal connected to its respective wheel vibration sensor through the negative lead wire, 20, 21, 22, and 23. Each light has its other terminal connected to the central power source though the car's accessory circuit so that the defect indicator is operative whenever the car's ignition switch is ON. Optionally the indicator panel can be wired with an in-line manual switch allowing the operator to switch off the indicator when driving on rough roads. The defect indicator unit 15 is approximately three inches long, two inches wide, and 0.75 inch deep, or it may be smaller in modular dimensions adapted to and integrated with other indicators on the car's instrument panel.

In operation the flexible wire conductor 12 with the weighted tip projecting into the vibration sensor is flexible enough to allow the tip to make electrical contact with the grounded metal tube or shell 10 when the wheel vibrates excessively from imbalance, tire defect, underinflation, or other cause. This contact between the tip of the flexible wire conductor and the metal tube or shell completes an electrical circuit, causing the corresponding light, 16, 17, 18, or 19, on the defect indicator panel to flicke or glow, thus showing which wheel is unbalanced or defective or which shock absorber is faulty.

ADVANTAGES TO USING THE INVENTION

1. Safety

Each year innumerable accidents occur on our highways due to tire failure of one kind or another. In these highway accidents many drivers and their families are severely injured or killed. If some means were available at moderate cost to monitor the running gear, tires, and suspension of cars and to warn drivers of potential danger, their cars and highways would be much safe for all. The proposed Drive Defect Detector system has the capability to detect and warn the operator of not only wheel or tire imbalance, but also to indicate the existence of a defective tire, e.g. ply separation or ply break which, if not detected, might result in tire failure or even a blowout. Therefore, a distinct advantage to using this invention is safety.

2. Conservation

While it would be difficult to ascertain or even estimate the number of tires removed from cars and discarded before their useful life or mileage has been utilized, we know it runs in the millions. This is a great waste of expensive, diminishing natural resources which could be avoided if unbalanced tires, damaged wheels, or faulty shock absorbers were detected in time for the operator to take remedial action and minimize unnecessary, excessive tire wear. Therefore, a distinct advantage to using this invention is resource conservation.

3. Convenience

One reason for owning a car is convenience; however, owning a car can impose on the owner or operator numerous inconveniences associated with normal car maintenance. One of these is the need to go to the garage or tire shop to have the wheels and tires checked for proper balance, an activity that often takes a good deal of time and causes considerable inconvenience. Since the invention here proposed would minimize the need for maintenance check except when shown necessary, a distinct advantage to using this invention is convenience.

4. Economy

The cost of cars and their maintenance increases every year, so it behooves the car owner to economize as much as possible. Obviously the safety factor mentioned above represents a dollar saving as do the conservation and convenience factors. For instance, it is obvious that the invention would obviate not only the expense of excessive tire wear, but also of balancing wheels/tires that do not need such service. Therefore a distinct advantage of this invention is economy.

Figure 2:
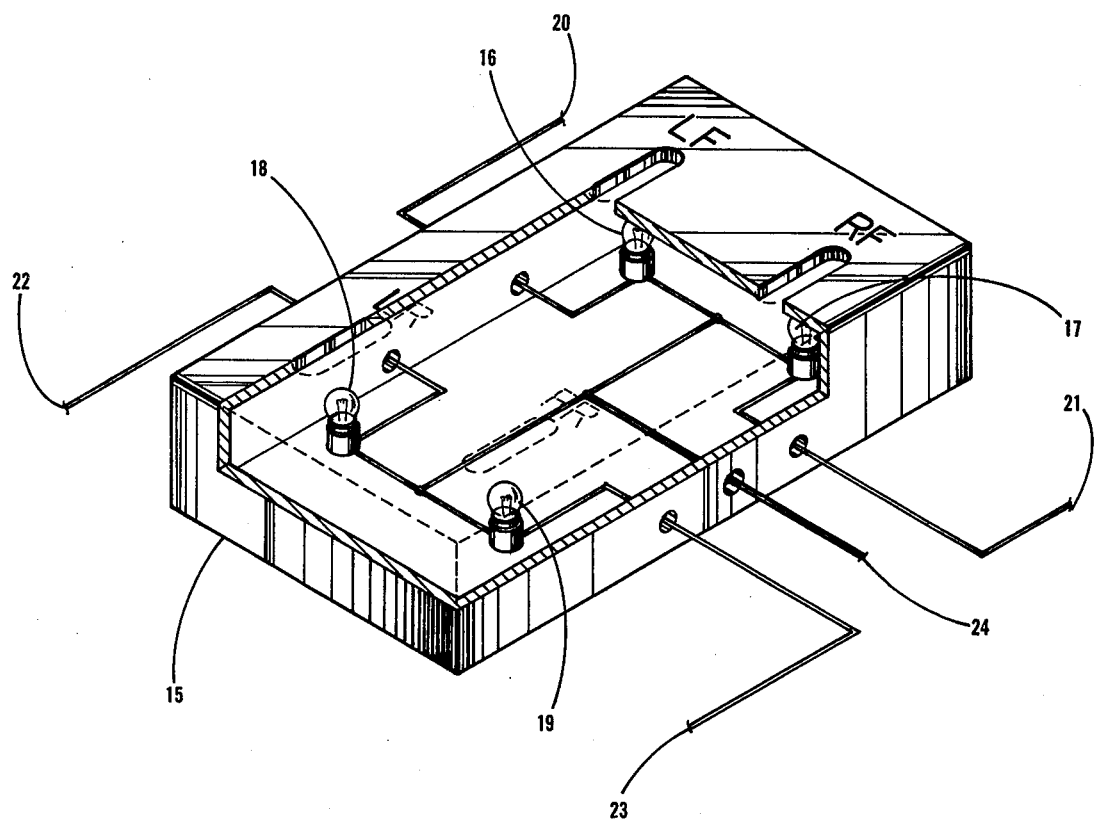
FIG. 2 is a perspective view, partially in section, of a defect indicator.
Figure 3:
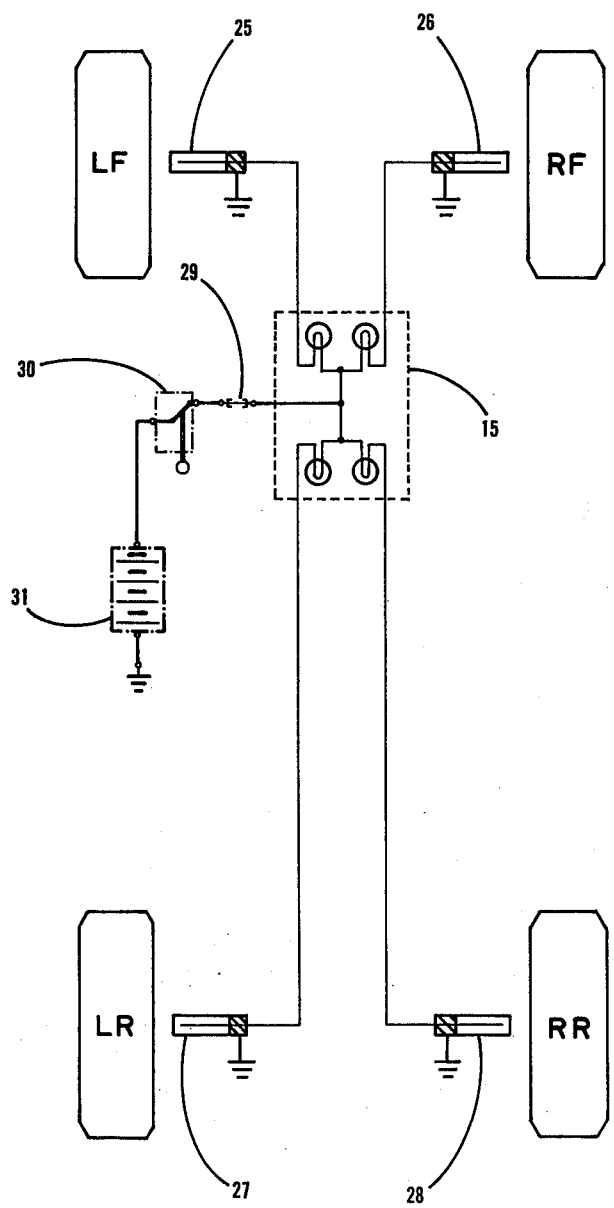
FIG. 3 is a schematic drawing of a typical Drive Defect Detector system.

What is claimed is:

1. A Drive Defect Detector system comprising:
   a. four vibration sensors, FIG. 1, one for each of a car's four wheels;
      (1) each vibration sensor having a water-tight cylindrical enclosure and fitted with a metal mounting bracket;
      (2) the enclosure being made of electrical conducting metal and bolted securely to the center axis of the suspension and close to each wheel;
      (3) the diameter of said enclosure being from 0.5 to 0.75 inch and housing a flexible wire center probe;
      (4) said enclosure being insulated with a plastic substance from said flexible center probe at its base;
      (5) said insulation covering an extent of 0.63 to 0.66 inch along the inboard base of said center probe;
      (6) said center probe being from 2.5 to 2.9 inches in overall length, with that portion not imbedded in insulation being from 1.87 to 2.29 inches in length;
      (7) said uninsulated portion of center probe thus being free to vibrate within the metallic enclosure and capable of making electrical contact with said enclosure;
      (8) electrical contact with said enclosure thus completing an electrical circuit through the metal mounting bracket or clamp to the car chassis, this being ground;
   b. one defect indicator to be located on or near the car's instrument panel, FIG. 2;
      (1) said defect indicator to be pressed or moulded from metal or durable, heat-resistant plastic;
      (2) said indicator's physical dimensions being approximately three inches long, two inches wide, and 0.75 inch deep or other modular dimensions permitting integration with other indicators on the instrument panel;
      (3) said indicator to have four small apertures in its top cover with a small light bulb mounted behind each opening;
      (4) said apertures and corresponding lights to be arranged in a rectangular configuration representing graphically the four wheels of the car;
      (5) said apertures to be marked individually to represent the left front, the right front, the left rear, and the right rear wheels of the car;
      (6) said markings serve to identify the four wheels, and the electrical connections capable of energizing the four lights to be wired to the vibration sensors located at the corresponding wheels;
      (7) electical connections to activate the Drive Defect Detector system are from the accessory terminal on the fuse panel to the Positive side of all four warning lights, thus rendering the system operative whenever the car ignition switch is turned ON;
      (8) electrical wiring is so arranged that intense vibration an any wheel will actuate the vibration sensor at that location, thus making contact to ground and causing the light behind the corresponding aperture on the defect indicator to flicker or glow;
      (9) said electrical wiring may include in the defect indicator an in-line manual switch enabling the operator of the car to turn the system off when driving on rough roads.

* * * * *